July 16, 1940.  G. C. R. KUIPER ET AL  2,208,132
BRAKING MECHANISM
Filed Jan. 30, 1933  2 Sheets-Sheet 2
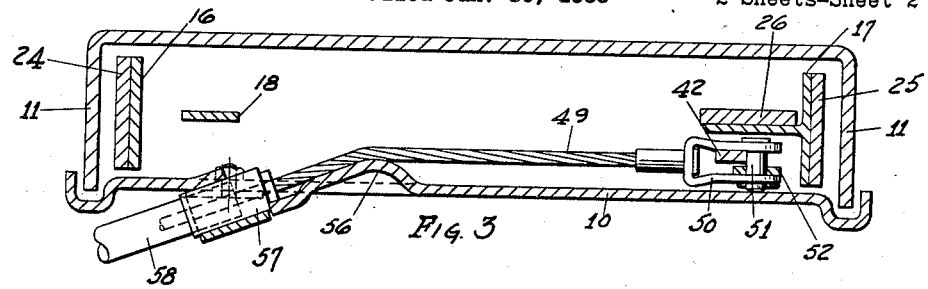
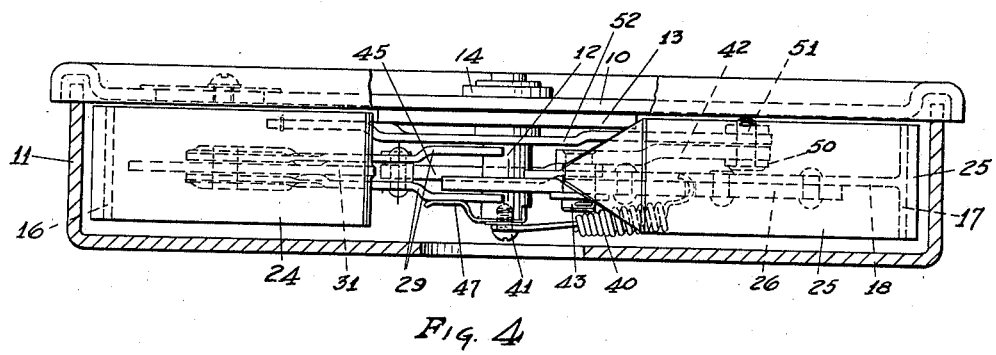
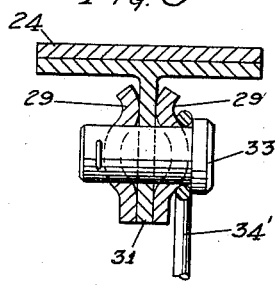
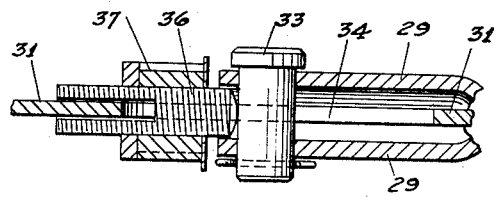
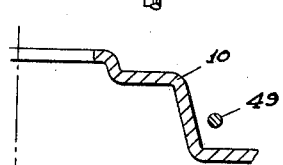
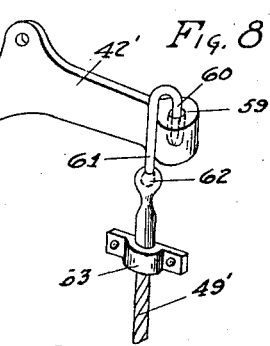
INVENTORS
GERHARD C.R. KUIPER AND
BY  MIRT MUKERJEE
  ATTORNEY Patented July 16, 1940

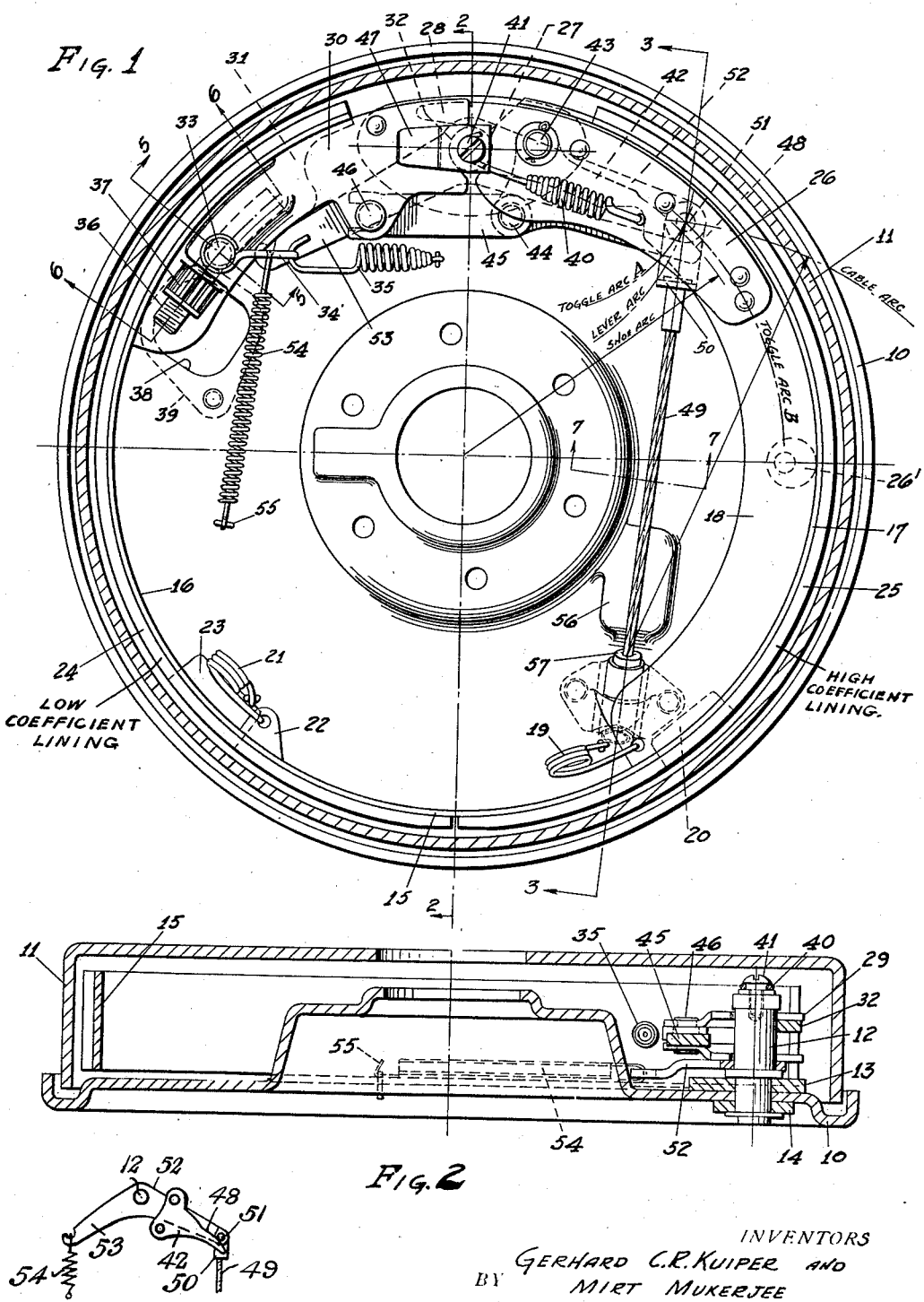

2,208,132

UNITED STATES PATENT OFFICE 2,208,132

BRAKING MECHANISM

Gerhard C. R. Kuiper and Mirt Mukerjee, Cleveland, Ohio, assignors to The Midland Steel Products Company, Cleveland, Ohio, a corporation of Ohio Application January 30, 1933, Serial No. 654,192

14 Claims. (Cl. 188—78)

This invention relates to new and useful improvements in brake mechanisms.

An important object of the invention is to provide a brake operating mechanism which reduces to a minimum, the objectionable kick back on the foot pedal prevalent in certain types of brake mechanism which is caused by the lunging and settling movement of the vehicle when brought to an abrupt stop.

Other objects and advantages of the invention will become apparent during the course of the following description.

In the accompanying drawings forming a part of the application and wherein like numerals are employed to designate like parts throughout the several views, Fig. 1 is an elevation of the brake mechanism applied to a backing plate, Fig. 2 is a transverse section of the same taken on the line 2—2 of Fig. 1, Fig. 3 is a transverse section taken in a different plane and on the line 3—3 of Fig. 1, Fig. 4 is an elevation of the same looking at the free ends of the brake shoe.

Fig. 5 is a transverse section taken on the line 5—5 of Fig. 1,

Fig. 6 is a transverse section taken on a plane at right angles to the line 5—5 and designated by the line 6—6 in Fig. 1, Fig. 7 is a transverse section on the line 7—7 of Fig. 1 showing the spacing of the cable from the major portion of the backing plate, Fig. 8 is a perspective view of a modified form of device, Fig. 9 is a view of the actuating linkage.

Referring now for details, to the drawings, the numeral 10 designates a backing plate for closing the open face of a brake drum 11. This backing plate takes the braking torque of the mechanism through a cylindrical anchor pin 12 which extends through a pair of reinforcing plates 13 and 14 suitably secured to opposite faces of the backing plate as illustrated.

A brake shoe structure is provided in the form of a one piece split circular band having a flexible half or side 16 and a rigid side or half 17 which is made more rigid by a radially extending leg or rib 18 extending from the free rigid end of the shoe to a point adjacent the central portion of the band. A section through the rigid side of the shoe, such as Fig. 3, illustrates the T-shaped section of one desirable form of shoe, although it is to be understood that other sections may be employed as well as a different type of shoe structure. The end of the rib 18 remote from the free end of the shoe is resiliently held by a spring 19 to the backing plate so as to retain one edge of the shoe in engagement with an embossed portion 20 of the backing plate and a similar spring 21 is connected to the backing plate and a lug 22 formed on the flexible side of the shoe for retaining this side of the band in contact with an embossed portion 23 of the backing plate to relieve friction between these two elements and to assist in floatingly mounting the shoe structure. The shoe of course, carries a facing of lining for frictional contact with the drum and this lining material on the flexible side of the shoe and designated by the numeral 24 has a low coefficient of friction, while the segment of lining 25 on the rigid side of the shoe possesses a high coefficient of friction. An eccentric 26' adjustably and rotatably mounted in the backing plate contacts with the rigid side of the shoe and forms a stop for determining release position of the shoe.

To one side of the reinforcing rib 18, at the rigid end of the shoe, a reinforcing segment 26 is suitably secured to the leg and at its free end is provided with an arcuate surface 27 for abutment with the anchor pin 12. The free end of the rib 18 is likewise provided with an arcuate surface for abutment with the anchor and it will be noted from Figs. 1 and 4, that the reinforcing plate is extended as at 28 above and beyond the anchor pin to be received between the laterally spaced plates 29 constituting an adjuster 30, circumferentially slidably straddling a radially extending rib 31 integral with the free end of the flexible side of the shoe. The ends of the adjuster plates 29 are provided with arcuate bearing surfaces 32 to normally engage the anchor pin 12 when the brake mechanism is in release position. A pin 33 extends transversely through the ends of the two arms 29 of the adjuster as well as through a slot 34 in the radial rib 31 and a bale 34' is connected to the pin for engagement with the hooked end of a tension spring 35 anchored to the backing plate for normally drawing the adjuster 30 into contact with the anchor pin 12.

An adjusting screw 36 abuts or may be made integral with pin 33 while its other end is slotted to straddle the edge of a slot 34 in the rib 31. A serrated nut 37 is mounted upon the screw within an enlarged portion of the slot in the reinforcing rib and a lock washer is provided to preclude accidental rotation of this nut. For adjustment, it may be reached through an opening 38 in the backing plate normally closed by a pivoted dust shield 39.

The rigid end of the shoe is normally held against the anchor pin by a tension spring 40 stronger than spring 35, one end of the spring being connected with the reinforcing plate 26, while its opposite end is hooked over the end of anchor pin 12 and retained thereon by means of the screw 41.

In order to move the brake shoe into contact with the drum, a form of toggle lever mechanism is employed, which consists of a virtual bell crank 42 hereinafter called the toggle lever fulcrumed on a pin 43 extending through the end of reinforcing rib 18 and plate 26. At a point spaced from the fulcrum, the toggle lever is pivotally connected as at 44 to a toggle link 45 bridging the space between the free ends of the shoe and slotted at its other end to slidingly engage a pin 46 mounted in the adjuster 30 carried by the flexible end of the band. While the outer end of the toggle link 45 is illustrated as being slotted, it will of course be understood that the end may be provided with a perforation to receive the thrust pin 46 between the two plates or extensions thereof constituting the adjuster 30. In order to preclude lateral movement of the flexible end of the shoe, a spring clip 47 fastened to the free end of the anchor pin 12 by means of the screw 41 and bears against the adjacent leg 29 of the adjuster as more clearly shown in Fig. 4.

The force receiving end of toggle lever 42 is provided with an arcuate surface 48 as struck by a radius having its locus near the center of backing plate 10. A flexible operating cable 49 is provided for operating the shoe spreading mechanism and if it were immovably connected to a single point at the operating end of toggle lever 42, an objectionable kick back on the brake pedal which is connected to the cable 49 in a manner well understood in the art, would develop each time the vehicle to which the brake mechanism is applied, is brought to a stop, due to the momentary action of the rigid side of the shoe moving away from the anchor as the vehicle stops, thus producing slack in the cable 49 which is almost spontaneously taken up by the rigid side of the shoe moving back against the anchor pin, thus producing an objectionable kick back on the foot of the operator which is continually depressing the pedal during a brake application. This objectionable operation of the brake mechanism is obviated by providing a compensating or floating connection between the cable and the force receiving end of toggle lever 42. In the preferred type, the flexible cable 49 is provided with a swivelled yoke or clip 50, the arms of which straddle the operating end of toggle lever 42 as best appreciated from Fig. 3 whereby a pin 51 extending through the arms of the yoke will roll upon the arcuate surface 48 of toggle lever. This pin 51 extends through a perforation in the free end of the bell crank lever 52 which is also disposed between the two arms of the yoke 50. This bell crank 52 is fulcrumed on anchor pin 12 between the inner arm 29 of the adjuster and a shoulder of the anchor pin as best seen in Fig. 4. The other arm 53 of the bell crank extends considerably beyond the anchor pin 12 to hook over one end of a tension spring 54, the opposite end of which is anchored at 55 to the backing plate 10. This spring of course, returns the operating lever 52 to its brake releasing position and under all conditions retains the cable 49 taut. The springs 35 and 40 which always urge the brake band into brake release position also constantly tend to break the elbow of toggle link 45 and toggle lever 42 thereby resulting in the free end of toggle lever 42 being urged upwardly of Fig. 1, thereby constantly urging the arcuate surface 48 of toggle lever 42 into engagement with the pin 51 for maintaining constant contact of these two parts.

The operating cable is held in proper spaced relation to the backing plate by its guidance over an instruck portion 56 of the backing plate from whence it is guided through a sleeve 57 extending obliquely through a suitably formed opening in the backing plate and also forms an end fitting for a flexible cable conduit 58 extending between the backing plate and the frame of the car. If cable 49 were connected to a fixed point on toggle lever 42, which is carried by the rigid side of the brake shoe, its point of connection would have a tendency to move along the "cable arc" shown in Fig. 1 whenever the rigid side of the shoe was moved toward the drum. The toggle lever 42 being carried by the rigid end of the shoe naturally moves generally along "toggle arc B" whenever the rigid side moves toward the drum and this would obviously produce slack in cable 49 permitting the foot pedal to slip forward when braking forward rotation of the drum, and then be abruptly backed against the operator's foot when the drum is brought to a dead stop. However, by the inclusion of the compensating connection between the cable and toggle lever, this objectionable kick back of the pedal is eliminated by reason of pin 51 riding up the arcuate surface 48 on toggle lever as the latter is moved in a clockwise direction with the rigid side of the shoe, thereby eliminating the temporary formation of slack in cable 49.

A modification of this compensating action is illustrated in Fig. 8 wherein the numeral 42′ designates the toggle lever formed at its operating end with a cup-like depression 59. In this depression is seated the free end 60 of a hook-shaped element 61 which is swivelled as at 62 to the operating cable 49′. Lateral movement of the free end of the cable 49′ is restrained by a suitable clip for the end member of a flexible conduit 63 which may be brought inside the drum and fastened in any suitable way to the backing plate. With this construction, it will be seen that movement of the bell crank 42′ with the rigid end of the shoe will merely swivel the hook-shaped element 61 on the axis of its longer arm thereby precluding the formation of any slack in the operating cable and thereby obviating any tendency of a kick back action on the brake pedal.

It is to be understood that various changes in the elements and arrangement thereof may be resorted to without departing from the scope of the appended claims.

We claim:

1. In a brake, a drum, a brake band engageable therewith and having separable rigid and flexible end portions, a lever engaging said end portions and carried by the rigid end to separate the end portions upon movement of the lever about its fulcrum, an operating cable, and a sliding joint between the cable and said lever minimizing slack in the cable upon shifting of the lever fulcrum with the rigid end portion of the shoe.

2. In a brake, a drum, a brake shoe engageable therewith and having separable ends, a lever fulcrumed on one of said ends and having a pivoted link pivotally connected with the other of the ends to separate them upon movement of the lever about its fulcrum, operating means, and a connection between said lever and operating means movable relative to the fulcrum as the latter shifts with the end of the shoe.

3. In a brake, a drum, a brake shoe engageable therewith and having separable ends, an anchor between said ends, a toggle lever fulcrumed on one of said ends and pivotally connected to the other separable end for separating the same, a second lever fulcrumed upon the anchor, and operating means connected with the second lever and riding upon the toggle lever for operating the same.

4. In a brake, a drum, a brake shoe engageable therewith and having separable ends, an anchor between said ends, a toggle lever fulcrumed on one of said ends for separating the same, said toggle lever having an arcuate surface coinciding with an arc substantially equal to the arc defined by the movement of the toggle lever, and a second lever fulcrumed upon the anchor and having means associated therewith and riding upon said arcuate surface of the toggle lever.

5. In a brake, a drum, a brake shoe engageable therewith and having separable ends, an anchor between said ends, a toggle lever fulcrumed on one of said ends for separating the same, a second lever fulcrumed upon said anchor and having means associated therewith for engaging the toggle lever at one side of the anchor for operating the toggle lever, and the other end of said second mentioned lever extending beyond the opposite side of the anchor and having spring means for returning the second lever to normal position.

6. In a brake, a drum, a brake shoe engageable therewith and having separable ends, a lever engaging said ends and movable relative thereto for separating the same, an operating cable extending into the drum, a yoke swivelly connected to the cable and straddling the end of said lever, and a pin bridging the arms of said yoke and riding upon the surface of said lever.

7. In a brake, a drum, an annular floating shoe engageable therewith and having rigid and flexible sides, an anchor between the ends of the shoe, a toggle lever fulcrumed on the rigid side of the shoe, a toggle link connecting said lever with the more flexible side of the shoe, means associated with the anchor for limiting lateral movement of the shoe, means normally tending to urge the ends of the shoe into engagement with said anchor, and the rigid side of said shoe having extensions overhanging said anchor and straddled by the more flexible side of the shoe.

8. In a brake, a drum, a brake shoe engageable therewith and having separable ends, an anchor between said ends against which either of said ends abut depending upon the direction of rotation of the drum, one end of the shoe having a pair of arms, a plate secured to the other end of the shoe and having its end arranged between said arms, and means carried by the anchor for limiting lateral movement of the shoe.

9. In a brake, a drum, a brake shoe engageable therewith and having separable ends with an anchor between the ends of the shoe, a lever engaging said ends and movable relative thereto for separating the same, an operating cable extending into the drum, an arm pivotally connected to the anchor, a yoke connected to said arm and swivelly connected to the cable and straddling the end of said lever, and a pin bridging the arms of said yoke and riding upon the surface of said lever.

10. In a brake, a drum, a brake shoe engageable therewith and having separable ends, a lever engaging said ends and movable relative thereto for separating the same, an operating cable extending into the drum, a yoke swivelly connected to the cable and straddling the end of said lever, said lever having an arcuate surface generated substantially on a radius of the lever, and a pin bridging the arms of said yoke and riding upon the arcuate surface of the lever.

11. In a brake, a drum, a brake shoe engageable therewith and having separable ends, an anchor between said ends, a lever for separating the same, a second lever fulcrumed upon said anchor and having means associated therewith for engaging the lever at one side of the anchor for operating the lever and the other end of said second mentioned lever extending beyond the opposite side of the anchor and having spring means for returning the second lever to normal position.

12. In a brake, a drum, a brake band engageable therewith and having rigid and flexible separable end portions, a lever fulcrumed on the rigid end portion to separate said end portions upon movement of the lever about its fulcrum, operating means for said lever, and a connection between said lever and operating means compensating for shifting of the lever fulcrum with the rigid end portion of said band to prevent involuntary movement of said operating means.

13. In a brake, a drum, a brake shoe engageable therewith and having separable ends, a lever to separate said ends upon movement about its fulcrum, a cable having sliding connection directly with said lever for actuating the same, and means controlling the relative movement between said cable and lever.

14. A brake comprising a backing plate having associated therewith floating friction means having adjacent separable ends provided with stiffening means and having an anchor arranged between the stiffening means of the two ends, a lever movable beside and parallel to the plane of the backing plate and fulcrumed on said anchor and having an operating tension connection extending outwardly through the backing plate, and another lever movable in a plane paralleling the backing plate and having at one end spreading means acting on both of said separable ends and acted on at its other end by the first lever in a manner permitting it to shift lengthwise relatively to the first lever.

GERHARD C. R. KUIPER.
MIRT MUKERJEE.